United States Patent [19]

Riley

[11] 4,227,512
[45] Oct. 14, 1980

[54] MEANS FOR PROTECTING SOLAR WATER HEATING EQUIPMENT AGAINST FROST DAMAGE

[75] Inventor: Harry J. Riley, Wembley, Australia

[73] Assignee: S. W. Hart & Co. Pty Ltd., Welshpool, Australia

[21] Appl. No.: 968,145

[22] Filed: Dec. 11, 1978

[30] Foreign Application Priority Data

Dec. 15, 1977 [AU] Australia ............................... PD2795

[51] Int. Cl.³ .................................................. F24J 3/02
[52] U.S. Cl. ..................................... 126/420; 137/59; 165/134 R; 138/28
[58] Field of Search ........................ 126/420, 422, 423; 237/66; 137/59–61; 165/134 R; 138/28, 27

[56] References Cited

U.S. PATENT DOCUMENTS

| | | | |
|---|---|---|---|
| 1,952,780 | 3/1934 | Small | 138/28 |
| 2,273,505 | 2/1942 | Florian | 138/28 |
| 3,407,837 | 10/1968 | Fulton et al. | 138/28 |
| 3,480,027 | 11/1969 | Noland | 137/59 |
| 3,989,032 | 11/1976 | Harrison | 137/59 |
| 3,999,708 | 12/1976 | Henkel | 137/59 |

Primary Examiner—James C. Yeung
Attorney, Agent, or Firm—Pollock, Vande Sande & Priddy

[57] ABSTRACT

A solar water-heater absorber with upper and lower cylindrical headers has a rubber tube within each header. These tubes are sealed at one end and connected at the other ends to rigid copper tubes extending through sealed ends of the headers and connected to a pair of normally flattened rubber tubes housed within a further pipe. This pipe is disposed in a situation free from frost and its interior is connected to the water supply pipe line to the absorber.

4 Claims, 5 Drawing Figures

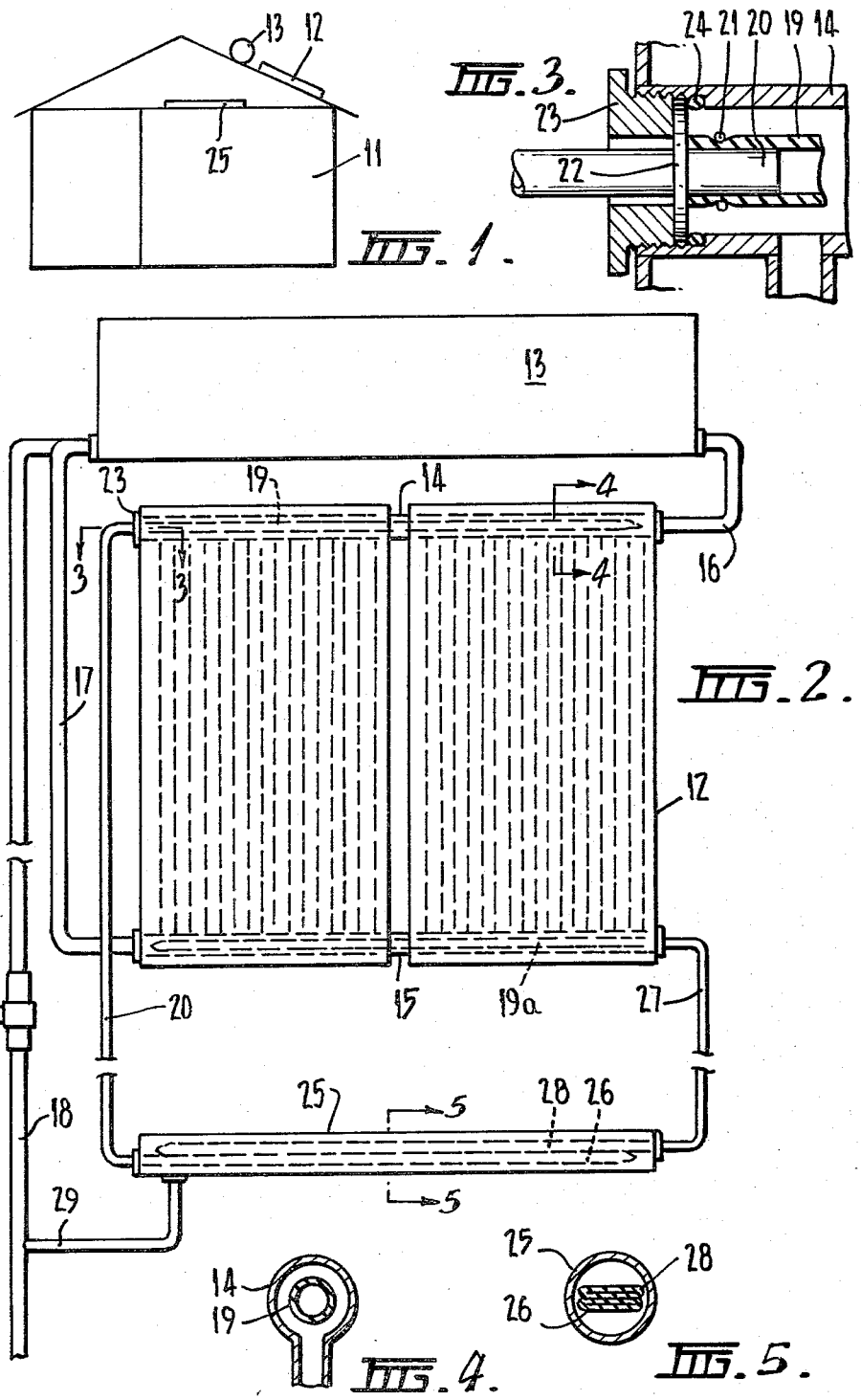

MEANS FOR PROTECTING SOLAR WATER HEATING EQUIPMENT AGAINST FROST DAMAGE

This invention relates to means for protecting solar water-heating equipment against frost damage. A problem experienced with solar water-heating equipment in regions subject to very cold weather is that the ambient temperature may fall to a sufficient extent for the water in a solar absorber, or other part of the water-heating equipment, to freeze, and the resultant expansion may burst part of the absorber or other part.

It has been proposed to deal with the problem of frost damage by installing relief valves in the headers of solar absorbers, but such devices have not been found to be very effective. Another method which has been proposed to deal with the problem is to place sealed resilient rubber tubes within the headers with the object of allowing the tubes to be compressed when ice formation occurs. However, this method has also been found unsatisfactory, in that air does not remain entrapped within the sealed rubber tube but rather seeps away in time, with the result that the tube remains in a flattened state during normal operating temperatures and does not therefore provide the emergency volume needed for ice formation.

Another disadvantage of the use of sealed rubber tubes is that, in order to provide for sufficient strength of the rubber and also for sufficient volume, the tube must occupy an undesirably large amount of the total space within the absorber header.

It is an object of this invention to provide means for protecting solar water-heating equipment against frost damage which is not subject to the disadvantages discussed above. With this object in view, the invention broadly comprises at least one resilient collapsible tube constructed for insertion within a solar absorber header, at least one additional resilient vessel which is normally in a collapsed state and is disposed externally of the header, and means for connecting the interior of said resilient collapsible tube to the interior of said additional resilient vessel.

Normally the additional resilient vessel is disposed in a location spaced from the solar absorber where it is safe from the effects of frost. Preferably it is also disposed within an exterior vessel which is connected to the water pipe line, whereby the water pipe line pressure is applied to the exterior of the said additional resilient vessel.

Other objects and features of the invention will be apparent from the following description of a preferred embodiment of the invention and from the accompanying drawings, wherein:

FIG. 1 is a schematic view of a building such as a private residence having solar water-heating equipment, FIG. 2 is a diagrammatic representation of a solar water-heating equipment, and FIGS. 3, 4 and 5 are enlarged detailed cross-sectional views on the lines 3—3, 4—4 and 5—5, respectively, of FIG. 2.

Referring firstly to FIG. 1, this illustrates diagrammatically a building 11 having mounted on the roof thereof a solar absorber unit 12 and a tank 13. The absorber unit 12 and tank 13 are shown in greater detail in FIG. 2. As seen therein, the absorber has a cylindrical upper header 14 and a cylindrical lower header 15.

There is a water outlet 16 from the upper header 14 running into the tank 13 and a return line 17 from the tank 13 into the lower header 15. The tank 13 has a mains inlet 18 which runs into the tank and there is also an outlet which forms no part of the present invention and is not shown.

In accordance with this preferred form of the invention, the upper header 14 is fitted internally with a length of resilient rubber tubing 19 extending for almost the entire length of the header. One end of the tube 19 is sealed and the other end is fitted onto the end of a length of copper pipe 20 of small diameter, about 3 mm. As shown in FIG. 3, the end of the pipe 20 is inserted within the end of the rubber tube 19 and is held tightly by a circlip 21 which encircles the rubber tube. The copper tube 20 has a disc 22 which is brazed or soldered in a water tight manner on the tube 20. The assembly is held in place in the end of the header 14 by means of an end collar 23 which is screwed into the end of the header with the disc 22 engaged between the end face of the plug 23 and an O-ring 24. Thus the end of the header is sealed and communication is provided between the interior of the rubber tube 19 and the bore of the copper tube 20.

The other end of the copper tube 20 extends within the interior of a length of pipe 25 and is connected therein to a flattened rubber tube 26 so that the bore of the tube 20 communicates with the bore of the flattened tube 26 and is sealed from the atmosphere. The opposite end of the tube 26 is sealed.

The lower header 15 is similarly provided with an internal rubber tube 19a which is similar to the tube 19 and is sealed from the interior of the header 15 and is connected to a further length of copper tube 27, the connection being similar to that shown in FIG. 3. The opposite end of the copper tube 27 extends into the pipe 25 and is connected therein to the bore of a second flattened tube 28 which is similar to the tube 26 and nests in conjunction with it within the pipe 25, as shown in FIG. 5.

The exterior surfaces of the tubes 20 and 27 are sealed to the pipe 25 at their entries into it, so that the space within the pipe 25 surrounding the tubes 26 and 28 is sealed from the atmosphere, and this space is connected by a further pipe 29 to the mains pressure water line 18.

It will be evident that there are two closed fluid capacities, one comprising the tube 19, tube 20 and tube 26, and the other comprising the tube 19a, the tube 27 and the tube 28. Preferably each of these capacities is filled with a non-toxic anti-freeze fluid. A suitable fluid for the purpose is a vegetable cooking oil having a freezing point well below the ambient temperature likely to be experienced in the region in which the equipment is installed. Normally the major part of the fluid in each case is within the parts of the two capacities within the headers 14 and 15, as the tubes 26 and 28 are normally in their flattened condition and are therefore almost devoid of contents.

An important aspect of the invention is that the pipe 25 should be located in a place where it is protected against frost. In FIG. 1 the pipe 25 is shown in a suitable location directly above the ceiling of a living area of the building. In another arrangement, not shown in the drawings, the pipe 25 may be located within the tank 13, preferably in a pocket between the container wall and the insulation surrounding it.

Under good weather conditions the solar absorber operates in the normal way with the water passing through the respective headers 14, 15 around the lengths of rubber tube 19, 19a therein, and these lengths of tube remain in their normal cylindrical formation. The pressure head outside each of the tubes 19, 19a is opposed by a corresponding pressure head in the fluid within them. If the ambient temperatures should drop to cause expansion of the water in the headers due to a temperature in the vicinity of 0° C., or if the water should commence to form ice, the consequent expansion within the respective headers is compensated for by partial compression of the resilient rubber tubes 19, 19a, passes through the respective copper tubes 20 and 27 into the interior of the normally flattened tubes 26 and 28 and causes the latter to expand to a partial extent. This expansion displaces some of the water from within the pipe 25 into the mains pressure line 18 through the pipe 29.

When a thaw occurs the fluid within the sealed capacities can return as the tubes 26 and 28 become flattened again due to their normal resilience, aided by the mains pressure applied externally to them.

An arrangement according to the invention is found in practice to operate satisfactorily with little or no attention, and to be quite effective in reducing damage to solar heating installations by frost.

I claim:

1. A solar water heater comprising a solar absorber header and being provided with means for protection against frost damage, wherein the means for protection against frost damage comprises
   (a) a resilient collapsible tube within said solar absorber header, said resilient collapsible tube being closed at one end and open at the other end;
   (b) a resilient vessel which is normally in a collapsed state, said resilient vessel being located externally of said header and being provided with an opening; and
   (c) a rigid pipe connecting the open end of said resilient collapsible tube with the opening of said resilient vessel, whereby, in use, a quantity of liquid is contained in said resilient tube and said resilient vessel is normally in a collapsed state but, if water in said header drops to a temperature at which it is subject to expansion, liquid is reversibly expelled from said resilient tube and passed through said rigid tube into said resilient vessel until the temperature of the water in said header rises.

2. A solar water heater according to claim 1, wherein said resilient vessel is disposed within an external vessel which is connected to a water supply pipe line so that water supply pipe line pressure is applied to the exterior of said resilient vessel.

3. A solar water heater according to claim 1, comprising spaced upper and lower headers, wherein first and second said resilient collapsible tubes are respectively located within said upper and lower headers, each of said collapsible tubes being connected through a respective rigid pipe to a respective resilient vessel to provide two enclosed capacities.

4. A solar water heater according to claim 3, wherein each said resilient vessel is disposed within an external vessel which is connected to a water supply pipe line so that water supply pipe line pressure is applied to the exterior of each said resilient vessel.

* * * * *